H. P. MOTTER.
YIELDABLE PULLEY.
APPLICATION FILED JAN. 12, 1910.
975,564.
Patented Nov. 15, 1910.
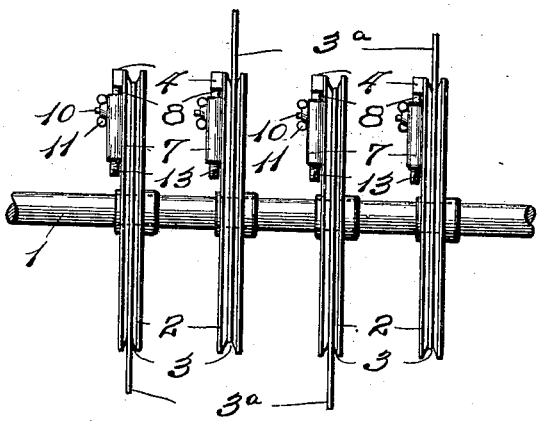
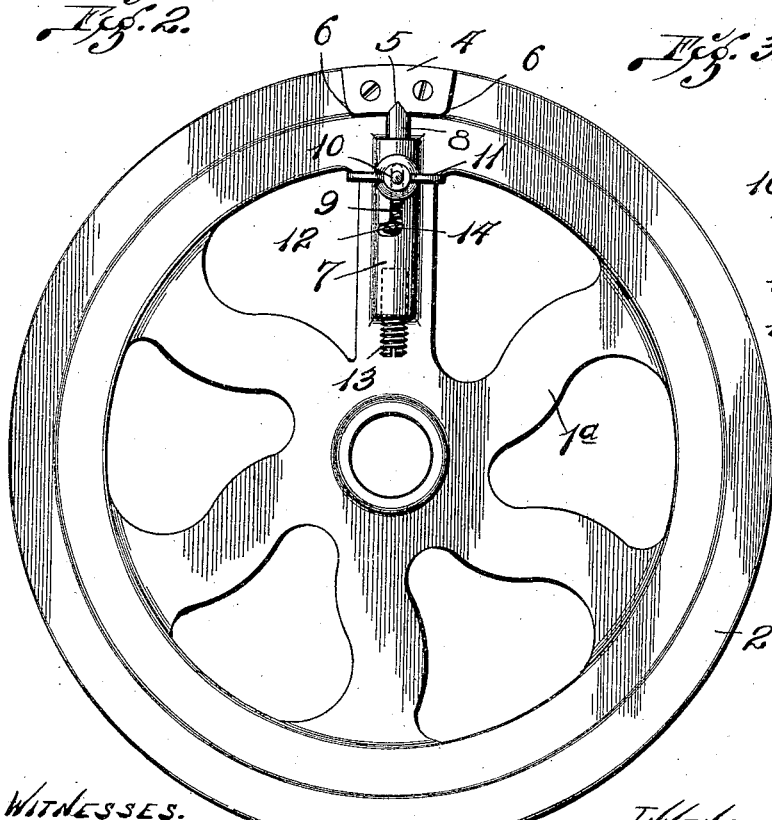
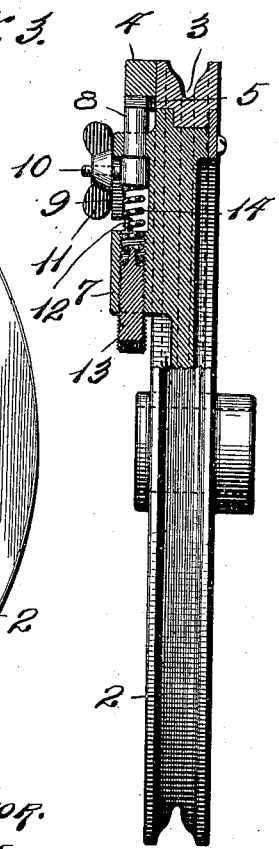
WITNESSES.
INVENTOR.
HARRY P. MOTTER.

UNITED STATES PATENT OFFICE.

HARRY P. MOTTER, OF HARRISBURG, PENNSYLVANIA, ASSIGNOR OF ONE-HALF TO J. W. BOWMAN, OF HARRISBURG, PENNSYLVANIA.

YIELDABLE PULLEY.

975,564. Specification of Letters Patent. Patented Nov. 15, 1910.

Application filed January 12, 1910. Serial No. 537,750.

*To all whom it may concern:*

Be it known that I, HARRY P. MOTTER, a citizen of the United States, residing at Harrisburg, Pennsylvania, have invented a certain new and useful Improvement in Yieldable Pulleys, of which the following is a full, clear, and exact description, such as will enable others skilled in the art to which it appertains to make and use the same, reference being had to the accompanying drawings, forming part of this specification, in which—

Figure 1 is an elevation of a series of yieldable pulleys constructed in accordance with my invention and used in connection with a cash carrier apparatus. Fig. 2 is a side elevation of one of the pulleys. Fig. 3 is an edge view of the pulley with parts thereof in section.

My invention relates to a yieldable pulley particularly intended for use in connection with a cash carrier apparatus wherein a driven shaft carries a series of pulleys, upon which operate belts or cables which extend to various parts of the store in which the apparatus is located and which belts are adapted to receive and carry the money boxes or receptacles utilized in conveying the money received by the clerks and the change to be delivered to the purchaser to and from the cashier's desk.

In cash carriers of the type above referred to, it very frequently happens that the belts or cables become caught in some part of the apparatus, or that the money boxes or receptacles are caught at the wrong station, thus resulting in a breakage of the belt or cable or some other part of the apparatus, and consequently throwing the entire apparatus out of service.

I propose to overcome the objections above mentioned by providing all of the main driving pulleys with slip rings, grooved to receive the belts or cables, and which slip rings normally rotate with the main portions of the pulleys but which will cease to rotate when the belt or pulley stops by reason of its being caught and held by some portion of the apparatus.

My invention consists essentially of a wheel or pulley, a grooved ring mounted on the edge thereof and a yielding connection between the body of the wheel or pulley and the groove ring, which conection will yield when the belt or cable operating on said ring is stopped for any reason, and thus the main driving shaft and the remaining pulleys can operate in the usual manner while the stopped belt or cable can be released.

My invention further consists in certain novel features of construction and arrangement of parts herinafter more fully described and claimed.

Referring by numerals to the accompanying drawings, 1 designates the main driving shaft of the carrier apparatus which is usually located adjacent the cashier's desk and upon which shaft the grooved pulleys are mounted. Ordinarily these pulleys are constructed in one piece but in my improved apparatus each pulley comprises a main body portion $1^a$ composed of a hub, spokes and rim and arranged on the periphery of said rim is a ring 2 in the outer face of which is formed a groove 3 which receives the usual belt or cable $3^a$.

Formed on or fixed to the ring 2, is a block 4, and formed on the inner face thereof is a notch 5. The inner corners of this block 4 are preferably rounded or beveled off as designated by 6.

Formed on the corresponding face of the body $1^a$ of the pulley, is a housing 7, and arranged to slide freely through the forward end thereof is a pin 8, the forward end of which is wedge-shaped and adapted to normally occupy the notch 5.

Seated in the rear end of this pin 8 and projecting outward through a slot 9 formed in the top of the housing 7, is a threaded pin 10, which receives a winged nut 11. This threaded pin and winged nut provide means for drawing the pin 8 into the housing 7, and, if desired, the winged nut can be tightened upon the threaded pin in order to lock the pin 8 at any point in its movement.

The rear end of the slot 9 is provided with a notch 12 into which the pin 10 may be shifted when the pin 8 is drawn into the housing 7, thus holding the point of said pin 8 out of engagement with the notched block 4.

Screw-seated in the inner end of the housing 7 is a plug 13 and located within the housing between this plug and the rear end of the pin 8 is an expansive coil spring 14. By means of this screw plug 13 the tension of the spring 14 can readily be adjusted and such adjustment also governs the degree of pressure of the pin 8 against the notched block 4.

When in use, the spring 14 holds the pin 8 in the forward end of the housing 7 and with the point of said pin seated in the notch 5 and as a result, the groove ring 2 travels with the central portion of the pulley, which latter is fixed upon the driving shaft 1 and the belt or cable travels in the usual manner in the groove in said ring.

In case the belt is accidentally caught and stopped by some portion of the apparatus, the ring 2 will likewise stop but the main body portion of the pulley will continue to rotate with the main driving shaft.

When the ring stops or ceases to rotate with the same speed as the main body portion of the pulley, the pin 8 will be forced a slight distance into the housing 7 against the pressure of the spring 14. Thus the driving shaft and remaining pulleys will continue to operate in the usual manner while the belt or cable which has been caught and stopped is released or repaired.

If desired, the winged nut can be tightened on the threaded pin 10 to lock the pin 8 when the forward end thereof is seated in the notch 5, or, if desired, the pin 8 can be drawn into the housing 7 and locked therein after the pin 10 has been moved into the notch 12.

The plug 13 is adjusted in the housing 7 to regulate the tension of the spring 14, which tension governs the pressure of the forward end of the pin against the notched block 4.

A yieldable pulley of my improved construction is comparatively simple, can be easily adjusted and provides a simple safety device which will save much time and expense in repairs of a cash carrier apparatus due to the stoppage of the belt or cables.

I claim:

1. In a cash carrier apparatus, a constantly rotating member, a grooved slip ring mounted thereon, a yielding pin on the rotating member, which pin engages a portion of the slip ring, and means for regulating the degree of pressure of the yielding member against the slip ring.

2. In a cash carrier apparatus a constantly rotating member, a grooved slip ring carried thereby, a yielding adjustable member forming a connection between the constantly rotating member and the slip ring and means whereby the yielding member may be locked in engagement with the slip ring.

3. In an apparatus of the class described, a pulley, a grooved slip ring loosely mounted on said pulley, a lug on the slip ring in which lug is formed a notch, and a spring-pressed pin carried by the pulley, the point of which pin normally engages in the notch in the lug.

4. In an apparatus of the class described, a pulley, a grooved slip ring carried thereby, a notched projection on the slip ring, a spring-pressed member, the point of which normally engages in the notch, means whereby said spring-pressed member may be held out of engagement with the notched lug, and means whereby the pin may be locked in engagement with said notched lug.

5. In an apparatus of the class described, a pulley, a grooved slip ring carried thereby, a sliding member on the pulley, the outer end of which is adapted to engage with a portion of the slip ring, a spring bearing against the sliding member, means for regulating the tension of the spring, means for holding the sliding member disengaged from the slip ring, and means for locking said sliding member in engagement with the slip ring.

In testimony whereof I hereunto affix my signature in the presence of two witnesses, this 10th day of December, 1909.

HARRY P. MOTTER.

Witnesses:
PAUL A. KUNKEL,
ALMA L. TROSTLE.